(12) United States Patent
Borowicz

(10) Patent No.: US 11,720,076 B2
(45) Date of Patent: Aug. 8, 2023

(54) METHODS, SYSTEMS, AND HEADER STRUCTURES FOR TOOLING FIXTURE AND POST-CURE FIXTURE CALIBRATION

(71) Applicant: The Boeing Company, Chicago, IL (US)

(72) Inventor: Clifford D. Borowicz, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 46 days.

(21) Appl. No.: 17/471,082

(22) Filed: Sep. 9, 2021

(65) Prior Publication Data

US 2021/0405622 A1 Dec. 30, 2021

Related U.S. Application Data

(62) Division of application No. 16/384,533, filed on Apr. 15, 2019, now Pat. No. 11,144,037.

(51) Int. Cl.
*G05B 19/00* (2006.01)
*G05B 19/401* (2006.01)
(Continued)

(52) U.S. Cl.
CPC ....... *G05B 19/401* (2013.01); *G05B 19/4184* (2013.01); *G06T 7/001* (2013.01);
(Continued)

(58) Field of Classification Search
None
See application file for complete search history.

(56) References Cited

U.S. PATENT DOCUMENTS 9,586,367 B2 * 3/2017 Drewett ................. B29C 73/10
2010/0228384 A1 * 9/2010 Neumaier .......... G05B 19/4083
700/173

(Continued)

FOREIGN PATENT DOCUMENTS

| EP | 2181835 | 5/2010 |
| EP | 3196720 | 7/2017 |
| EP | 3434459 | 1/2019 |

OTHER PUBLICATIONS

European Patent Office, Extended European Search Report for related European Patent Application No. 20169562, dated Sep. 16, 2020.

(Continued)

*Primary Examiner* — Paul B Yanchus, III
(74) *Attorney, Agent, or Firm* — Kolitch Romano Dascenzo Gates LLC

(57) ABSTRACT

Systems and methods provide for the determination and correction of tooling deviation by comparing two different three-dimensional surface scans of a composite panel after curing. Such methods and systems may allow for less accurate post-cure fixturing (e.g., holding the panel in a less constrained state, as compared to prior art techniques), while still maintaining a sufficient amount of precision for predictive shimming and shimless techniques. Methods include performing a first three-dimensional surface scan, performing a second three-dimensional surface scan, and comparing the two to determine a deformation function corresponding to tooling deviation. In some systems, a header structure is used to hold the composite panel in a nominal configuration for the second three-dimensional surface scan. In some systems, scanning devices perform mirrored scanning on either side of the composite panel, using a common reference frame.

20 Claims, 10 Drawing Sheets

(51) Int. Cl.
*G05B 19/418* (2006.01)
*G06T 7/00* (2017.01)
*G06T 7/33* (2017.01)
*B29L 31/30* (2006.01)

(52) U.S. Cl.
CPC ............ *B29L 2031/3082* (2013.01); *B29L 2031/3085* (2013.01); *G05B 2219/50062* (2013.01); *G06T 7/337* (2017.01); *G06T 2207/10028* (2013.01)

(56) References Cited

U.S. PATENT DOCUMENTS

2012/0101757 A1* 4/2012 Morancho Rodr guez et al. ........ G01N 21/9515
702/81

2017/0136698 A1 5/2017 Kia et al.

OTHER PUBLICATIONS

Jamshidi et al., Manufacturing and assembly automation by integrated metrology systems for aircraft wing fabrication, Institution of Mechanical Engineers Proceedings, Journal Engineering Manufacture, vol. 224, Part B, 2010.

Smith, Concept Development of an Automated Shim Cell for F-35 Forward Fuselage Outer Mold Line Control, Masters Research Paper, The Graduate School University of Wisconsin-Stout, Dec. 1, 2011.

Fernandez et al., Investigation of the buckling and load-bearing behaviour of selectively stitched stiffened CFRP panels under multiaxial loading, CEAS Aeronautical Journal, 2019.

* cited by examiner

METHODS, SYSTEMS, AND HEADER STRUCTURES FOR TOOLING FIXTURE AND POST-CURE FIXTURE CALIBRATION

RELATED APPLICATION

The present application is a continuation of and claims priority to U.S. patent application Ser. No. 16/384,533, filed on Apr. 15, 2019, entitled "METHODS, SYSTEMS, AND HEADER STRUCTURES FOR TOOLING FIXTURE AND POST-CURE FIXTURE CALIBRATION," which issued Oct. 12, 2021 as U.S. Pat. No. 11,144,037, the complete disclosure of which is incorporated by reference.

FIELD

The present disclosure relates generally to methods of tooling fixture and post-cure fixture calibration, and more particularly to methods of scanning surfaces to calibrate tooling fixtures and post-cure fixtures, and systems and header structures for use in some disclosed methods.

BACKGROUND

In FIG. 1, an example of an apparatus 10 that may be constructed from composite structures such as composite panel skins 12 is provided in the form of an aircraft 14. Aircraft 14 includes a fuselage 16, which generally corresponds to the main body of aircraft 14 for holding passengers, crew, cargo, and/or equipment, for example, depending on the particular configuration and/or function of aircraft 14. Fuselage 16 is elongate and somewhat cylindrical or tubular, and constructed of multiple fuselage sections 18 that are longitudinally spaced along fuselage 16 and operatively coupled together to define fuselage 16. Aircraft 14 also includes wings 22, horizontal stabilizers 24, and a vertical stabilizer 26, each of which may be constructed as a unitary structure or in subsections that are subsequently assembled together. One or more of fuselage 16, fuselage sections 18, wings 22, horizontal stabilizer 24, vertical stabilizer 26, and/or a structural subsection thereof may be constructed using one or more composite panel skins 12.

FIG. 2 depicts an illustrative, non-exclusive example of a composite panel skin 12, as used to form one of fuselage sections 18 of aircraft 14 of FIG. 1. Some composite panel skins 12 are operatively coupled to and supported by a structural frame 28, as shown in FIG. 2. Composite panel skins 12 may be described as defining the outer shape of fuselage 16. FIGS. 3a and 3b illustrate another non-exclusive example of a composite panel skin 12, as used to form an aircraft wing, such as wing 22 of aircraft 14 of FIG. 1. As shown in FIGS. 3a-3b, wing 22 may be formed by securing a plurality of composite panel skins 12 to an internal frame 30. Internal frame 30 may be formed of a plurality of ribs 32 and spars 34 (FIG. 3a), with one or more composite panel skins 12 being secured to internal frame 30 (FIG. 3b) to form wing 22. Wing 22 may also include a flap 36, an aileron 38, and a wing cap 40.

As used herein when referencing aircraft 14, fuselage 16, and/or a corresponding composite panel skin 12, the terms "inner" and "outer" refer to the radially inward side and the radially outward side, respectively, of the corresponding composite structure. Accordingly, the outer side of a composite structure or a component part thereof generally faces away from the composite structure, and the inner side thereof generally faces an internal volume that is defined by the composite structure. For example, an outer side 42 of fuselage section 18 (FIG. 2) may be defined by respective outer surfaces 43 of composite panel skins 12, while an inner side 44 of fuselage section 18 may be defined by respective inner surfaces 45 of composite panel skins 12, and faces an internal volume 46 of fuselage section 18. Similarly, an outer side 48 of wing 22 (FIG. 3b) may be defined by respective outer surfaces 43 of composite panel skins 12, while an inner side 50 of wing 22 may be defined by respective inner surfaces 45 of composite panel skins 12, and be arranged to face internal frame 30. Similar relative terms may be used with respect to composite panel skins 12 other than those used to form fuselage 16 or wing 22, and/or with respect to apparatus 10 other than aircraft 14. Such outer surfaces also may be referred to herein as outer mold line ("OML") surfaces, and inner surfaces may also be referred to herein as inner mold line ("IML") surfaces.

Composite structures, such as composite panel skins 12, are generally formed by laying up a plurality of layers of composite material onto a mold tool, or tooling fixture, such as a layup mandrel. The composite material is placed under vacuum and cured, after which it is removed from the tooling fixture for post-cure processing. Composite parts are often formed with one side (the "tool side") positioned against the tooling fixture, and the other side facing away from the tooling fixture (the "bag side"). Depending on the particular part and its application, composite parts may be formed with either their inner (IML) surface or outer (OML) surface facing the mold. FIG. 4 illustrates an example of an IML-controlled mold tool 52, where a composite part (such as one of composite panel skins 12 of fuselage section 18 of FIG. 2) may be formed with inner surface 45 of composite panel skin 12 positioned against a convex mold surface 54. FIG. 5 illustrates an example of an OML-controlled mold tool 56, which may be used to make the same composite part as IML-controlled mold tool 52 of FIG. 4, except with outer surface 43 of composite panel skin 12 positioned against a concave mold surface 58. Composite panel skins for aircraft are generally OML tooled (e.g., generally formed on an OML-controlled mold tool), such that the surface that ultimately becomes the panel's outer surface is placed against the mold tool. This may help increase smoothness in the surfaces exposed to the airstream, while the bag side surface of a composite part often experiences more variability than the tool side due to, for example, the bagging process, resin flow through the part, subassembly placement (e.g., placement of stringers, in case the case of an aircraft wing assembly), ply stacking sequence, and/or thickness variation in individual plies used to form the part.

Throughout conventional panel fabrication processes, deviation often creeps in that causes the part to depart from its engineering nominal designed state. For example, bond assembly, tooling deviation, bagging, curing, de-bagging, inspection, trimming, drilling, and/or painting can all contribute to deviation in the as-produced part, as compared to its nominal configuration. Often, a composite panel skin will 'spring off' the tooling fixture as it is removed after curing, due to residual stresses in the panel. The panel skin will then assume a slightly different shape as it is held by a separate post-cure fixture (due to discrete loads imparted to the part by the post-cure fixture, because these parts are generally large and semi-compliant), which holds the panel skin during post-cure operations, such as trimming and drilling.

At assembly, the part generally does not deform back to the configuration it was in when held by the post-cure fixture because the substructure doesn't load the part the same way the post-cure fixture does. Thus, any deviations in the post-cure fixture (e.g., discrepancies between the exact shape of the part as it is held by the post-cure fixture and the part's nominal configuration) can translate to deviations in the final part. In a specific example, any deviation present in the post-cure fixture can impact hole placement for holes drilled in the part, edge trimming accuracy, and/or the final shape of the part. Such deviation is difficult to isolate, can compromise the integrity of surface scans performed on the part, and introduces unknowns in production. However, post-cure fixture accuracy in a production environment can be very expensive and/or difficult to maintain.

Compensation for deviations in how a post-cure fixture holds a panel skin is generally time-consuming and expensive, and, in some cases, may require sacrificial machining on the part or substructure to which it is being assembled (e.g., sacrificial machining of ribs of an aircraft wing assembly), and/or placement of shims. Other conventional techniques for compensating for post-cure fixture deviation have included dedicated hard tooling that accurately holds one side of the part. However, such dedicated hard tooling limits production because it requires multiple tooling setups and more trim/drill gantries, each of which drives up manufacturing time and capital tooling costs.

SUMMARY

Presently disclosed systems and methods provide for the determination and correction of tooling deviation by comparing two different three-dimensional surface scans of a composite panel (e.g., large semi-compliant structures) after curing. Such methods and systems may allow for less accurate post-cure fixturing (e.g., holding the panel in a less constrained state, as compared to prior art techniques), while still maintaining a sufficient amount of precision for predictive shimming and shimless techniques. Simplified tooling constraints for post-cure fixtures may provide further cost avoidance, as well. Disclosed methods and systems generally involve establishing an outer mold line (OML) surface of the panel relative to an inner mold line (IML) surface of the panel.

One exemplary method of post-cure fixture calibration for determining deviation introduced into a panel during manufacturing includes performing a first scan to create a first three-dimensional surface scan of the inner surface of the panel while the panel is secured to a tooling fixture or post-cure fixture, and performing a second scan to create a second three-dimensional surface scan of the inner surface of the panel while the panel is held at a nominal configuration by a header structure. The tooling fixture is configured to support the panel during forming of the panel, with the outer surface of the panel facing the tooling fixture. The method also includes removing the panel from the tooling fixture (or post-cure fixture) and securing the panel to the header structure after the first scan is performed. The header structure is specifically configured to hold the panel in its nominal, as-designed, state, such that differences between the two scans reflect deviation present in the tooling fixture or post-cure fixture. Methods also include determining a deformation function corresponding to the deviation between the first three-dimensional surface scan and the second three-dimensional surface scan.

Other presently disclosed methods involve mirrored scanning to determine deviation introduced into a panel during manufacturing. Such methods include fixturing the panel by holding it at at least two locations via a fixture. While the panel is held by the fixture, a first metrology scan is performed on the outer surface of the panel, and a second metrology scan is performed on the inner surface of the panel. The respective metrology scans are each performed with respect to the same reference frame, and result in a respective first three-dimensional surface scan of the outer surface of the panel and a second three-dimensional surface scan of the inner surface of the panel. Methods also include determining an IML surface of the panel relative to an OML surface, using the first three-dimensional surface scan and the second three-dimensional surface scan, to characterize tooling deviation of a tooling fixture or post-cure fixture used to form the panel.

BRIEF DESCRIPTION OF THE DRAWINGS

FIG. 3b is a prior art example of a wing assembly for an aircraft, including the internal frame of FIG. 3a.

DESCRIPTION

Figure 1:
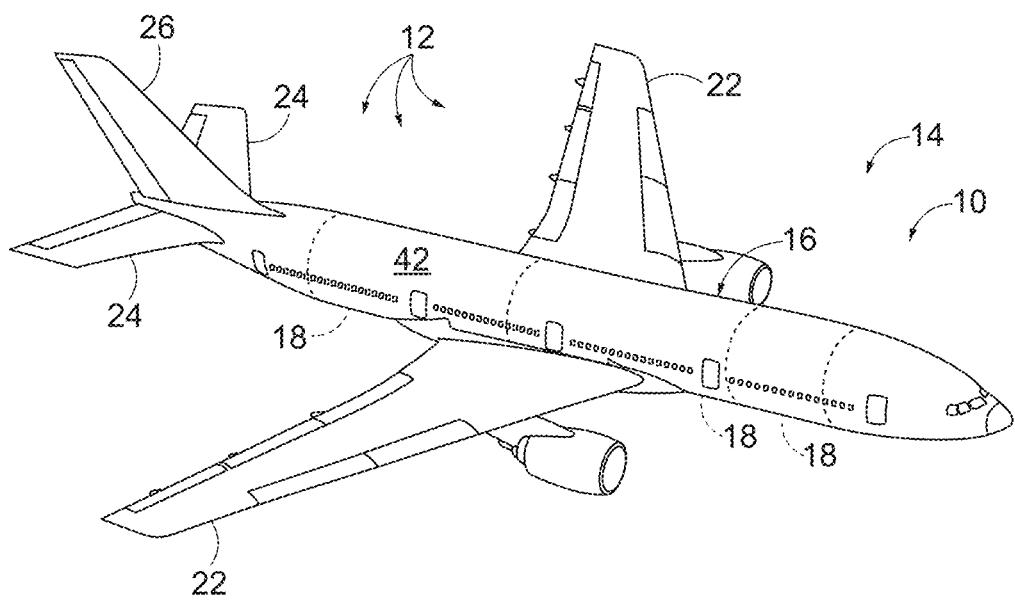
FIG. 1 is a prior art perspective view of an aircraft which may be formed of one or more composite panel skins.
Figure 2:
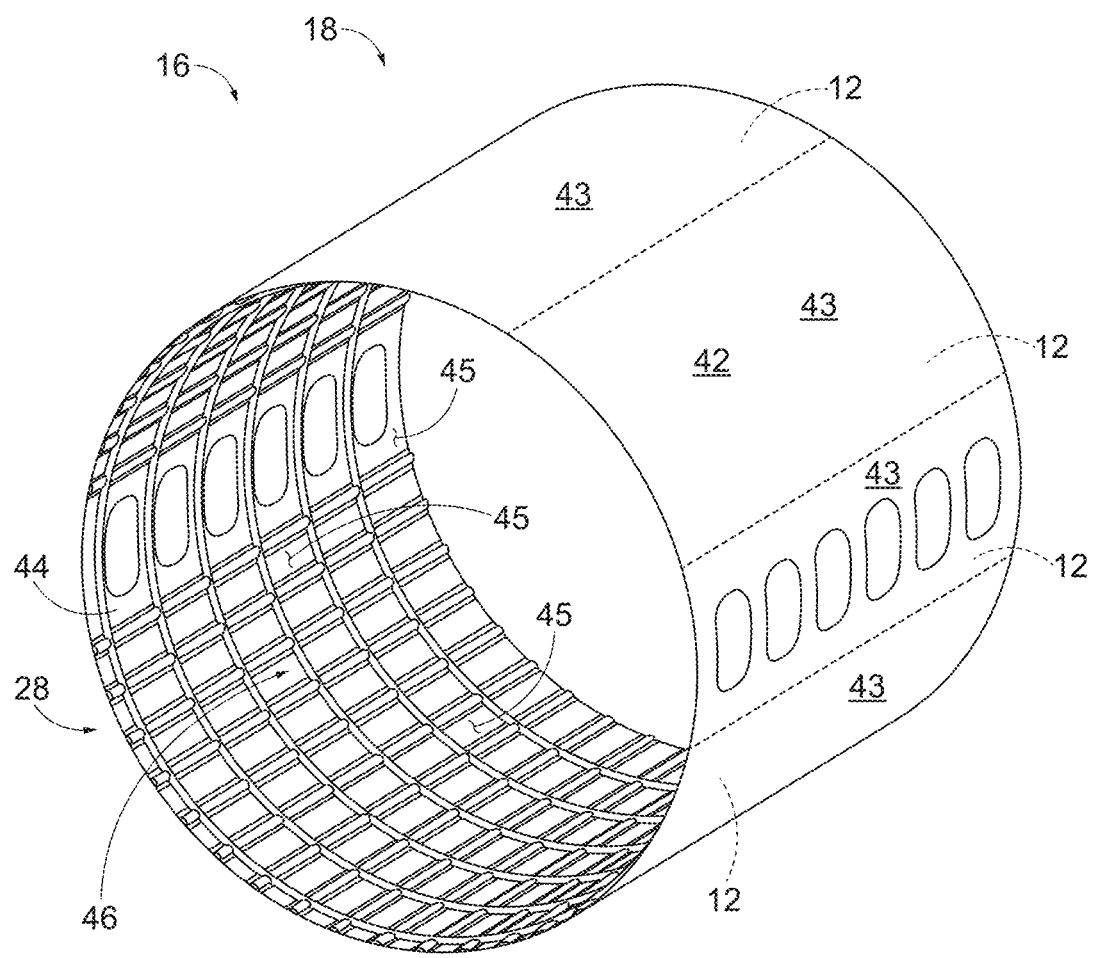
FIG. 2 is a prior art example of a composite panel skin.

Disclosed methods, systems, and apparatus aim to identify and/or compensate for deviation occurring in tooling fixtures designed to hold parts, such as composite panel skins, during manufacturing (e.g., lay up and cure), and/or occurring in post-cure fixtures designed to hold parts for post-cure manufacturing operations. Such disclosed methods, systems, and apparatus may be useful for, for example, shimless or predictive shimming applications, and/or in assembly of large semi-compliant structures, such as in aircraft wing and fuselage panel production.

In general, in the Figures, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure. Elements that serve a similar, or at least substantially similar, purpose are labeled with like numbers in the Figures, and these elements may not be discussed in detail herein with reference to each Figure. Similarly, all elements may not be labeled in each Figure, but reference numerals associated therewith may be utilized herein for consistency. Elements, components, and/or features that are discussed herein with reference to one or more Figures may be included in and/or utilized with any other Figure without departing from the scope of the present disclosure. Similarly, in Figures illustrating method flowcharts, some steps are illustrated in dashed boxes, indicating that such steps may be optional or may correspond to an optional version of a method according to the present disclosure. That said, not all methods according to the present disclosure are required to include the steps illustrated in solid boxes. The methods and steps illustrated in the Figures are not limiting and other methods and steps are within the scope of the present disclosure, including methods having greater than or fewer than the number of steps illustrated, as understood from the discussions herein.

Figure 6:
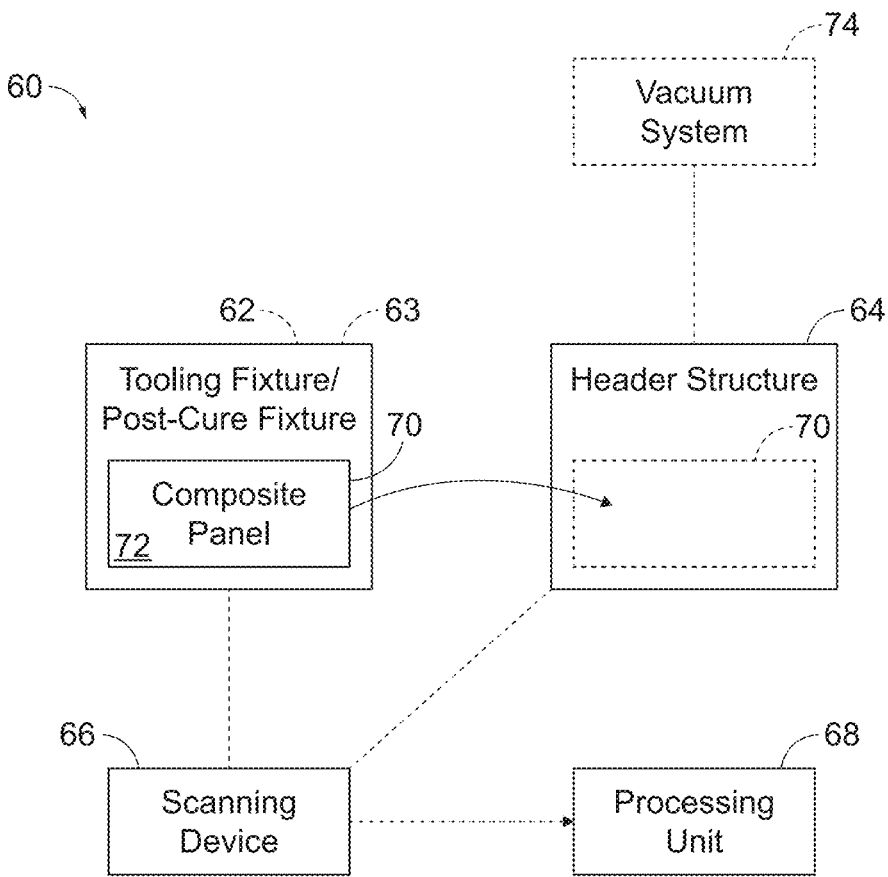
FIG. 6 is a schematic, black-box representation of non-exclusive examples of systems for tooling calibration, according to the present disclosure.

FIG. 6 schematically illustrates examples of a system 60 for fixture calibration to determine deviation introduced into a panel during manufacturing. System 60 generally includes a tooling fixture 62, a header structure 64, a scanning device 66, and a processing unit 68. Tooling fixture 62 supports a composite panel 70 during forming of composite panel 70. For example, tooling fixture 62 may be a layup mandrel on which a plurality of layers of composite material are placed and cured, such that the layers of composite material form composite panel 70, taking the shape of tooling fixture 62. In some examples, tooling fixture 62 may be OML-controlled such that an outer surface of composite panel 70 faces tooling fixture 62 during while composite panel 70 is formed. In these examples, an inner surface 72 faces away from tooling fixture 62 during forming. In other examples, tooling fixture 62 may be IML-controlled, such that inner surface 72 of composite panel 70 faces tooling fixture 62 while the panel is formed. In some examples of system 60, tooling fixture 62 may be a post-cure fixture 63 that is designed to hold composite panel 70 for post-cure operations, such as trimming and drilling Scanning device 66 is configured to perform a first three-dimensional surface scan of the surface of composite panel 70 facing away from tooling fixture 62 (or from post-cure fixture 63). For example, scanning device 66 may be configured to perform a first three-dimensional surface scan of inner surface 72 of composite panel 70, while composite panel 70 is supported by tooling fixture 62 (e.g., before the panel is removed from the layup mandrel, or other tooling fixture 62). After the first three-dimensional surface scan is performed, composite panel 70 is removed from tooling fixture 62 (or post-cure fixture 63) and secured to header structure 64, which is configured to hold composite panel 70 at a nominal configuration. The nominal configuration corresponds to the size and shape of composite panel 70, as designed, such that even if residual stresses in composite panel 70 cause it to "spring off" of tooling fixture 62 and thus depart from its intended, or designed, nominal configuration, header structure 64 is configured to hold and support composite panel 70 in the correct nominal configuration. In some examples, header structure 64 may be formed of materials that are easy to manufacture or shape, such that header structure 64 may serve as a relatively inexpensive way of holding composite panel 70 with as little deviation from nominal as possible. In one example, header structure 64 may be formed of foam headers, though other materials are within the scope of the present disclosure. Header structure 64 also may enable composite panel 70 to be constrained at more interfaces than when composite panel 70 is held by tooling fixture 62. Once composite panel is so secured by header structure 64, scanning device 66 may then perform a second three-dimensional surface scan of the same surface scanned during the first three-dimensional surface scan (e.g., inner surface 72), while composite panel 70 is held in its nominal configuration by header structure 64.

By comparing the first and second three-dimensional surface scans, differences between the configuration of composite panel 70 as held by tooling fixture 62 (or post-cure fixture 63) and the nominal configuration of composite panel 70 (as held by header structure 64) may be identified. Thus, the difference between the first and second three-dimensional surface scans reflects tooling deviation present in tooling fixture 62 (or post-cure fixture 63). Processing unit 68 is configured to analyze and process the first and second three-dimensional surface scans to determine a deformation function corresponding to deviation between the two.

Scanning device 66 may be (or include) a non-contact scanning device spaced apart from composite panel 70. For example, scanning device 66 may take the form of a time-of-flight 3D laser scanner, a triangulation-based 3D laser scanner, a hand-held laser scanner, a structured-light 3D scanner, a modulated light 3D scanner, a stereoscopic video camera system, a photometric camera system, a laser-pulse-based 3D scanner, a laser phase-shift 3D scanner, and/or a lidar system. Additionally or alternatively, scanning device 66 may be (or include) a contact scanning device configured to physically contact composite panel 70 during scanning. For example, scanning device 66 may take the form of a coordinate measuring machine (CMM), an articulated arm suspended from a traveling carriage, and/or a touch probe.

Some systems 60 may include a vacuum system 74 configured to force composite panel 70 against header structure 64 until composite panel 70 is in its nominal configuration.

Figure 7:
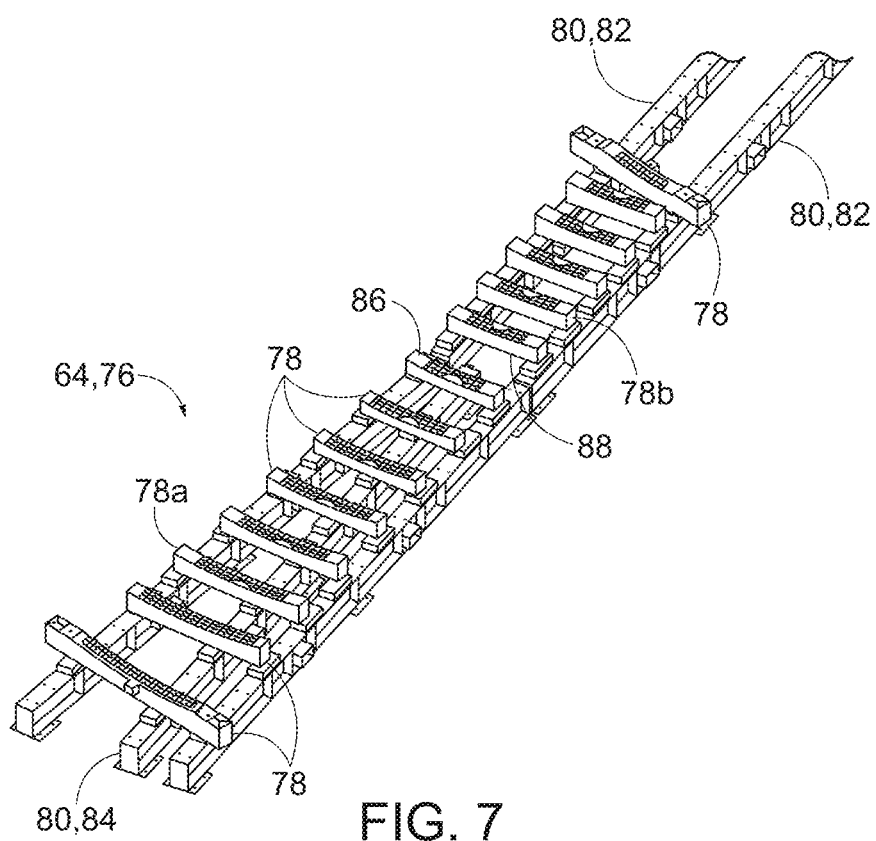
FIG. 7 is an example of a header structure for use in tooling calibration, according to the present disclosure.
Figure 8:
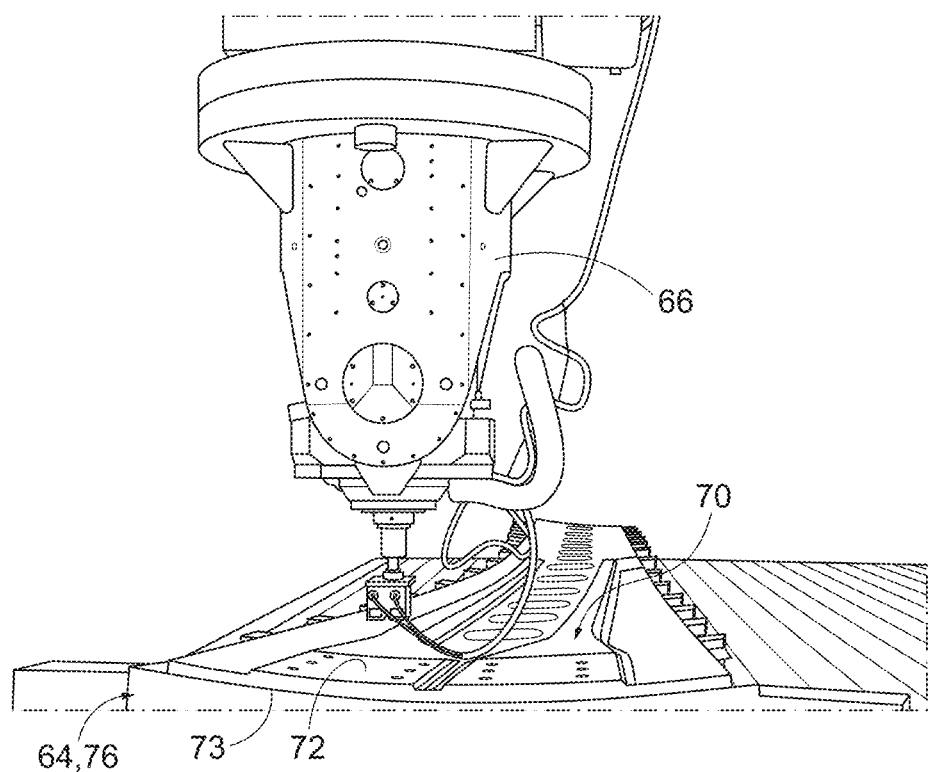
FIG. 8 is an example of a composite panel undergoing surface scanning while constrained by a header structure, according to the present disclosure.

FIG. 7 shows an example of header structure 64, in the form of header structure 76, while FIG. 8 illustrates an example of composite panel 70 secured to and supported by header structure 76 while being scanned by an example of scanning device 66. The examples of FIGS. 7-8 are non-exclusive and do not limit header structures 64, composite panels 70, or scanning devices 66 to the illustrated embodiments of FIGS. 7-8. That is, header structures 64, composite panels 70, and scanning devices 66 are not limited to the specific embodiments of those illustrated in FIGS. 7-8, and header structures 64, composite panels 70, and scanning devices 66 may incorporate any number of the various aspects, configurations, characteristics, properties, etc. that are discussed with reference to the schematic representation of FIG. 6 and/or the embodiments of FIGS. 7-8, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again in FIGS. 7-8, however, it is within the scope of the present disclosure that the previously discussed features, variants, etc. may be utilized with the examples shown in FIGS. 7-8.

As best seen in FIG. 7, header structure 76 includes a plurality of foam headers 78, though in other examples, headers formed of other materials may be used in the place of foam headers 78. Foam headers 78 are sized, shaped, and arranged with respect to one another to hold a composite panel in its nominal configuration. As shown in FIG. 7, foam headers 78 may be spaced apart from one another, with each foam header 78 being secured to one or more elongated supports 80. In the example shown in FIG. 7, header structure 76 includes three elongated supports 80, with two outer supports 82 being longer than and positioned on either side of a middle support 84. In other examples, other configurations of elongated supports 80 may be used. For example, header structures 64 may include more or fewer elongated supports 80, including more or fewer middle supports 84 and/or more or fewer outer supports 82. Each foam header 78 is generally secured to at least two elongated supports 80, while one or more respective foam headers 78 may be secured to different elongated supports 80 (and/or more or fewer elongated supports 80) than one or more other respective foam headers 78. For example, foam header 78a is secured to both outer supports 82 and to middle support 84, while foam header 78b is secured to outer supports 82, but not to middle support 84. In some examples, foam headers 78 may be secured to elongated supports 80 and then machined in place to ensure that header structure 76 is properly configured to constrain a composite panel as close as possible to its nominal configuration. Of course other examples of header structure 76 may include more or fewer foam headers 78, with the number and relative positioning of the foam headers 78 being determined by the specific needs of header structure 76 and the shape, size, and/or complexity of the nominal configuration of the composite panel.

Figure 9:
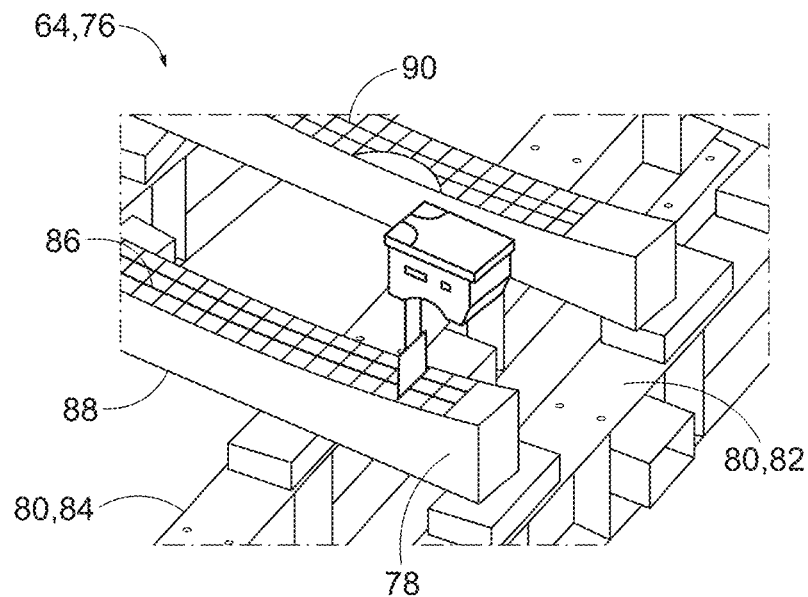
FIG. 9 is a close-up of a portion of the header structure of FIG. 7.

Each respective foam header 78 may include a respective upper surface 86 and a respective lower surface 88. FIG. 9 illustrates a close-up of a portion of header structure 76 of FIG. 7. As best seen in FIG. 9, upper surface 86 of one or more respective foam headers 78 may include a vacuum port grid 90, which may aid in positioning a composite panel on header structure 76. For example, vacuum port grid 90 may include a plurality of grooves, or channels, which each allow displacement of air via a vacuum system (e.g., vacuum system 74) operatively coupled to header structure 76. In some examples, header structure 76 includes seals (e.g., rubber seals or gaskets) positioned within the grooves of vacuum port grid 90, to aid in applying vacuum to a composite panel being constrained by header structure 76. As a vacuum is drawn via vacuum port grid 90, the composite panel is pulled into contact with upper surfaces 86 of foam headers 78, thereby constraining the composite panel in its nominal configuration. Such header structures 64 that include vacuum port grid 90, or other vacuum systems for securing a composite panel to the header structure, are sometimes referred to as vacuum fixtures. In some examples, the positions of vacuum port grid 90 and/or the positions of holes for operatively coupling the vacuum system thereto are selected to avoid interference with other manufacturing operations, such as drilling, that may occur while the composite panel is constrained by and/or supported by header structure 64.

Foam headers 78 generally are arranged with respect to elongated supports 80 such that respective lower surfaces 88 of foam headers 78 face and/or engage with (e.g., contact) elongated supports 80, while upper surfaces 86 of foam headers 78 face and engage the composite panel being supported and constrained by header structure 76. As best seen in FIG. 8, composite panel 70 is secured to header structure 76 such that the tool-side surface of composite panel 70 faces foam headers 78. For example, for an OML-tooled composite panel (e.g., a composite panel that is formed with its outer surface, or OML surface, against the mold tool), an outer surface 73 is positioned on upper surfaces 86 of foam headers 78, such that inner surface 72 faces and is scanned by scanning device 66 while composite panel 70 is held by header structure 76.

Composite panel 70 is generally secured to header structure 76 at a plurality of attachment points, but via at least two attachment points. For example, composite panel 70 may be secured at at least one attachment point per foam header 78. In some examples, composite panel 70 may be secured at at least two attachment points per foam header 78. In some examples, composite panel 70 may be secured to just a subset of the foam headers 78 of header structure 76, whereas, in other examples, composite panel 70 may be secured to each foam header 78 of header structure 76. In some examples, the attachment points are configured to be selectively controlled relative to one another to hold composite panel 70 in its nominal configuration. For example, the position and/or orientation of one or more respective foam headers 78 may be selectively adjustable to adjust how composite panel 70 is held in header structure 76. In some examples, the angle of a respective foam header 78 may be selectively adjusted with respect to one or more elongated supports 80, and/or a respective foam header 78 may be selectively translated along the length of one or more elongated supports 80. Additionally or alternatively, one or more respective foam headers 78 may be machined or have material added thereto, to selectively control one or more attachment points for holding a composite panel in its nominal configuration.

Figure 3A:
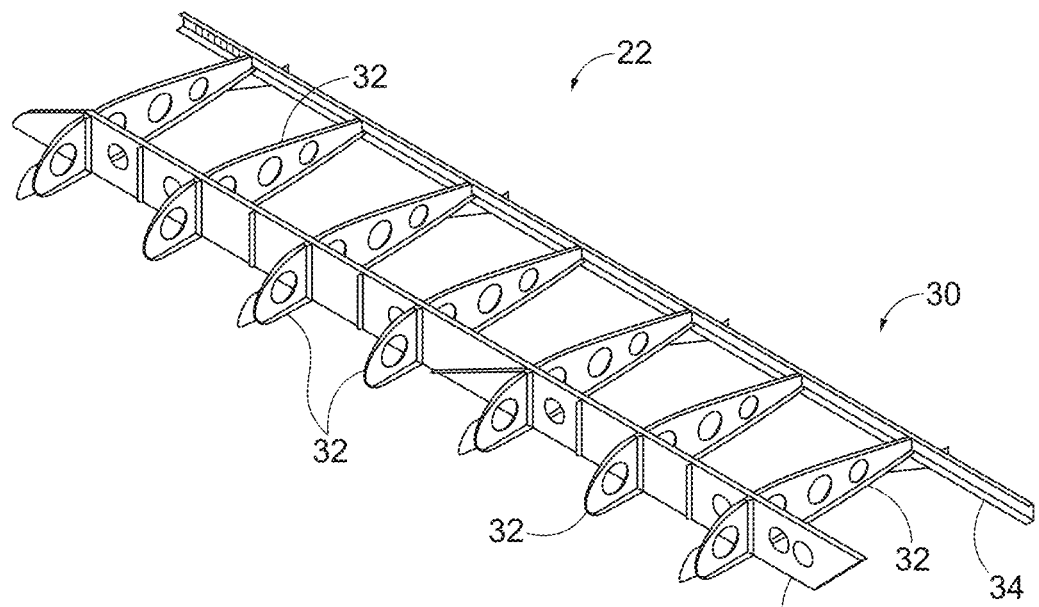
FIG. 3a is a prior art example of an internal frame for a wing assembly for an aircraft.
Figure 3B:
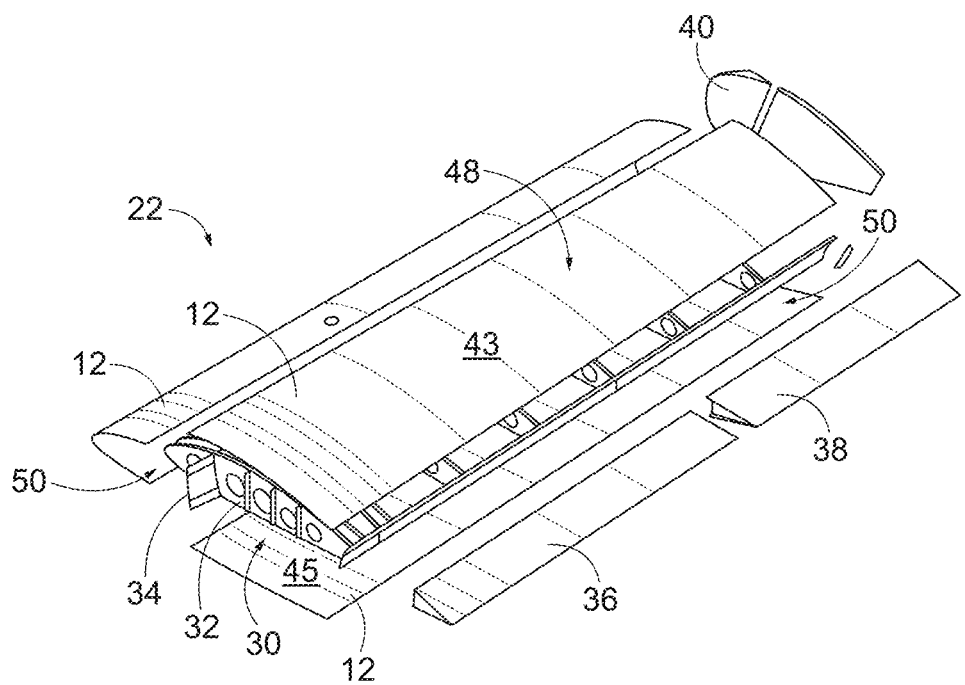
Figure 4:
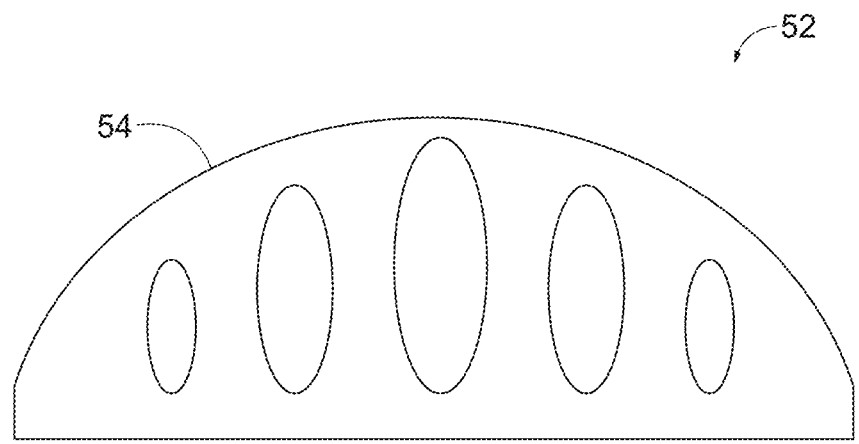
FIG. 4 is a prior art IML-controlled mold tool.
Figure 5:
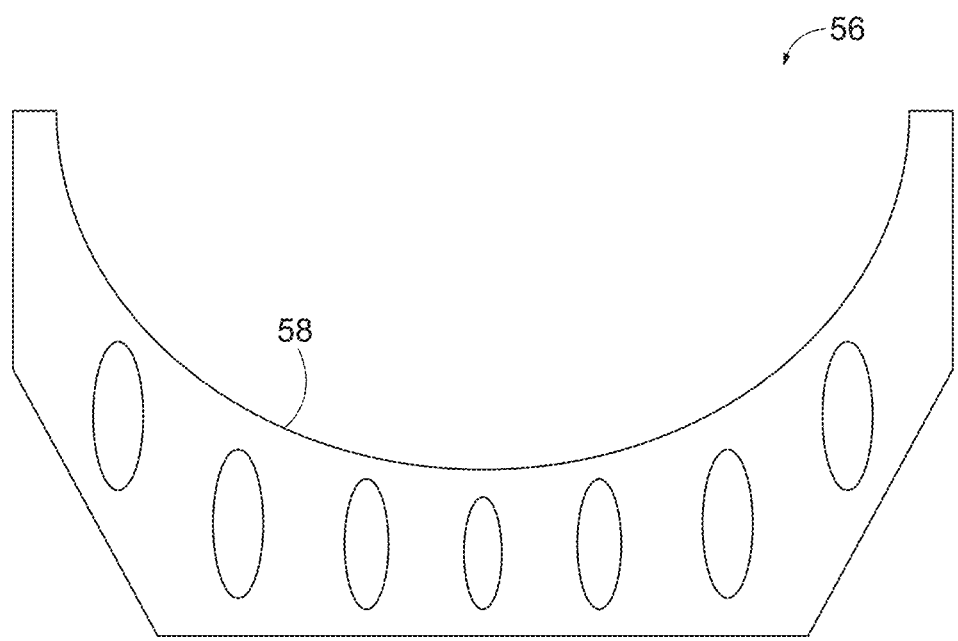
FIG. 5 is a prior art OML-controlled mold tool.
Figure 10:
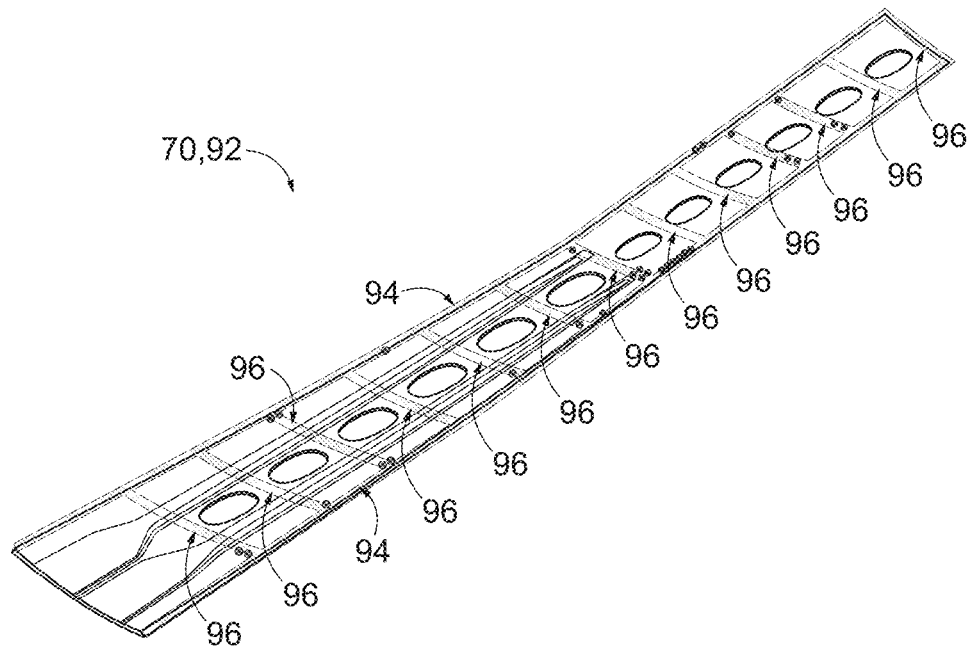
FIG. 10 is an example of a composite panel, showing examples of attachment points for securing the composite panel to a header structure, according to the present disclosure.

In some examples, header structure 64 (e.g., header structure 76) may be configured to hold a composite panel at a plurality of interface locations, to ensure that the interface locations are in the correct location according to the composite panel's nominal configuration. For example, header structure 64 may be designed and configured to hold a composite panel to its OML nominal configuration at rib and spar locations, where the composite panel will interface with (or mate with) the ribs and spars of the wing assembly to which the composite panel is ultimately attached. For example, FIG. 10 illustrates an example of composite panel 70, in the form of composite panel 92. Composite panel 92 is designed to be attached to a rib-and-spar assembly (e.g., internal frame 30 of FIG. 3a), such that composite panel 92 is brought into engagement with the rib-and-spar assembly at certain interface surfaces. For example, composite panel 92 includes spar flange interface surfaces 94 extending substantially longitudinally along composite panel 92 that are designed to engage spar flanges of the rib-and-spar assembly when the panel is assembled thereto. Similarly, composite panel 92 includes rib/shear tie interface surfaces 96 that are designed to engage the ribs and/or shear ties of the rib-and-spar assembly when the composite panel is assembled thereto. Some header structures 64 according to the present disclosure are specifically configured to ensure that such spar flange interface surfaces 94 and rib/shear tie interface surfaces 96 are held in the correct nominal configuration when composite panel 92 is held by header structure 64. In some examples, disclosed header structures 64 may be configured to constrain a composite panel at more interface surfaces than is allowed while the composite panel is secured to the tooling fixture.

Figure 11:
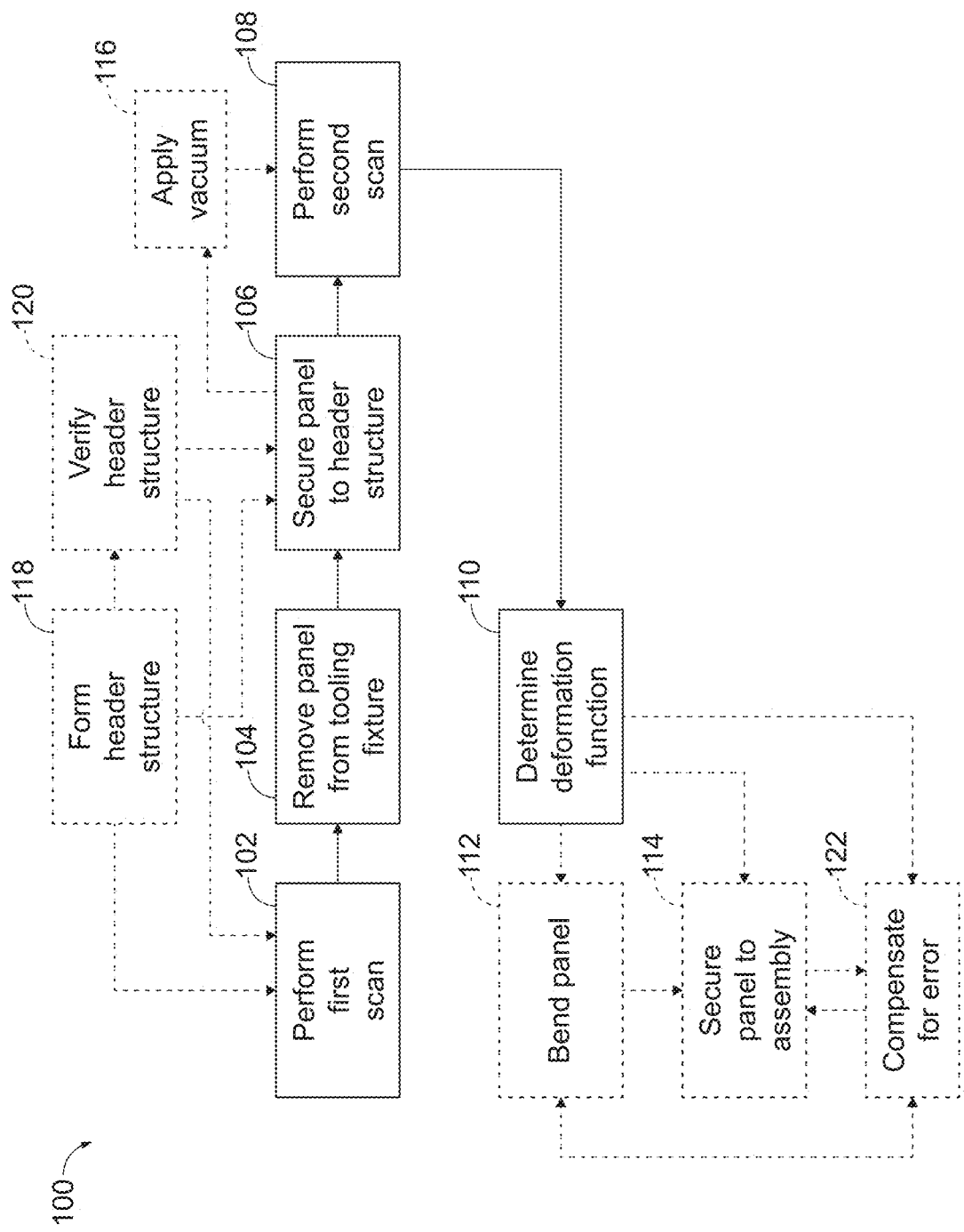
FIG. 11 is a schematic flowchart diagram of methods of tooling fixture (and/or post-cure fixture) calibration according to the present disclosure.

In use, systems 60 and header structures 64 of FIGS. 6-9 may be used to calibrate tooling fixtures (e.g., tooling fixture 62) and/or post-cure fixtures (e.g., post-cure fixture 63) to determine deviation introduced into a panel (e.g., composite panel 70) during manufacturing. In a specific example, systems 60 and/or header structures 64 may be used for production of panels for aircraft wings and/or fuselages. Additionally or alternatively, systems 60 and/or header structures 64 may be used in shimless or predictive shimming applications. FIG. 11 schematically provides a flowchart diagram that represents illustrative, non-exclusive examples of such methods 100 according to the present disclosure.

Methods 100 generally include performing a first scan of the panel at 102, removing the panel from the tooling fixture or post-cure fixture at 104, securing the panel to a header structure (e.g., header structure 64) at 106, performing a second scan of the panel at 108, and determining a deformation function at 110, thereby determining the deviation introduced by the tooling fixture or post-cure fixture while the panel was being formed. Performing the first scan of the panel at 102 is performed while the panel is secured to the tooling fixture (e.g., a layup mandrel or other mold tool), or while the panel is secured to the post-cure fixture. In the case of an OML-controlled tooling fixture, the outer surface of the panel is facing the tooling fixture while the panel is still on the tooling fixture after curing, and thus performing the first scan at 102 would be performed by scanning the inner surface of the panel. Performing the first scan at 102 includes creating a first three-dimensional surface scan of the scanned surface (e.g., the inner surface of the panel). Of course, in examples where the tooling fixture is an IML-controlled tooling fixture, the first scan would be performed on the outer surface of the panel, while the inner surface of the panel faces the tooling fixture.

After the first scan is performed at 102, the panel is removed from the tooling fixture or post-cure fixture at 104, and then secured to a header structure at 106, with the header structure being configured to hold the panel in its nominal configuration, which corresponds to the size and shape of the panel as-designed. Once the panel is so secured and constrained by the header structure at 106, the second scan is performed at 108 while the panel is secured to the header structure. Again, in the case of a panel formed on an OML-controlled tooling fixture, the panel will be secured to the header structure at 106 such that the outer surface of the panel faces the header structure, and thus performing the second scan at 108 would be performed by scanning the inner surface of the panel. Performing the second scan at 108 includes creating a second three-dimensional surface scan of the scanned surface (e.g., the inner surface of the panel). Of course, in examples where the tooling fixture is an IML-controlled tooling fixture, the second scan would be performed on the outer surface of the panel, while the inner surface of the panel faces the header structure. Because the header structure is holding the panel in its nominal configuration during the second scan, the second three-dimensional surface scan represents the three-dimensional surface of the panel in its nominal configuration. Thus, any differences between the first three-dimensional surface scan and the second three-dimensional surface scan represent the differences, or deviation, between the configuration the panel was held in while secured to the tooling fixture, and the panel's nominal configuration. Determining the deformation function at 110 determines the differences (deviation) between the first and second three-dimensional surface scans, maps this deformation, and may be used to determine the deviation present in the tooling fixture or post-cure fixture, and thus may be used to calibrate the tooling fixture or post-cure fixture, and/or account for such deviation from the given tooling fixture or post-cure fixture in future panel production using that tooling fixture or post-cure fixture.

In some methods 100, determining the deformation function at 110 is performed by one or more processing units (e.g., processing unit 68). Once the deformation function for a particular panel is determined, the information may be used to plastically deform, or bend, the panel (virtually and/or physically) at 112 in order to assemble the panel with other components (e.g., assembling composite panel 70 to a rib-and-spar assembly of an aircraft wing) at 114. For example, the deformation function may inform how to bend a panel during assembly with a rib-and-spar assembly such that the OML of the panel at assembly is as close to nominal as possible. Additionally or alternatively, the deformation function may be used to bend the panel at 112 to minimize gaps between the panel and the assembly to which it is attached. Bending the panel at 112 may include deforming the inner surface and/or outer surface of the panel. Determining the deformation function at 110 may include identifying specific areas of the panel that depart from nominal, and/or the extent to which those areas depart from nominal. Determining the deformation function at 110 also may include virtually mapping such deviation, and determining where gaps would be located when trying to assemble the panel to the rest of the structure.

Some methods 100 include drawing a vacuum at 116 to hold the panel against the header structure in the nominal configuration. Additionally or alternatively, some methods 100 include forming the header structure from a plurality of foam headers (e.g., foam headers 78) at 118 and/or verifying that the header structure is configured to hold the panel in the nominal configuration at 120. Forming the foam header at 118 may include positioning foam headers to support all critical interfaces of the panel. For example, foam headers may be positioned to support the surfaces of the panel that interface with, or engage with, the rest of the assembly. In a specific example, forming the header structure at 118 includes positioning the foam headers to support the spar flange interface surfaces and/or the rib/shear tie interface surfaces of the panel.

Performing the first scan at 102 and performing the second scan at 108 may be performed using the same scanning device (e.g., scanning device 66), or different scanning devices. In some examples, performing the first scan at 102 and/or performing the second scan at 108 include scanning the panel using a non-contact scanning device, such as a time-of-flight 3D laser scanner, a triangulation-based 3D laser scanner, a hand-held laser scanner, a structured-light 3D scanner, a modulated light 3D scanner, a stereoscopic video camera system, a photometric camera system, a laser-pulse-based 3D scanner, a laser phase-shift 3D scanner, and/or a lidar system. Additionally or alternatively, performing the first scan at 102 and/or performing the second scan at 108 may include scanning the panel using a contact scanning device configured to physically contact the panel during scanning, such as a coordinate measuring machine (CMM), an articulated arm suspended from a traveling carriage, and/or a touch probe. Performing the first scan at 102 and/or performing the second scan at 108 may include laser scanning (e.g., 3D laser scanning), optical scanning, computed tomography scanning, structured-light scanning, conoscopic holography, photogrammetry, contact-based 3D scanning, and/or laser pulse scanning.

In some methods 100, determining the deformation function at 110 may include establishing an IML surface of the panel relative to an OML surface of the panel, using the first three-dimensional surface scan and the second three-dimensional surface scan. One or more processing units may be used to determine the IML surface relative to the OML surface.

Methods 100 may be performed a plurality of times to characterize a set of panels (e.g., a set of panel skins for one or more aircraft wings). The resulting set of first three-dimensional surface scans and second three-dimensional surface scans may be used to characterize the set of panels to create a data set of an offset distance between the IML surface and OML surface of each panel. Information from such characterization, from the first and second three-dimensional surface scans, and/or from the deformation function may be used, along with known data analytics, for predictive shimming, as well.

Additionally or alternatively, some methods 100 include compensating for deviation at 122. For example, compensating for deviation at 122 may include compensating for deviation in the outer surface of the panel, as compared to the nominal configuration of the panel, using the deformation function. Similarly, compensating for deviation at 122 may include compensating for deviation in the inner surface of the panel, as compared to the nominal configuration of the panel, using the deformation function. In some examples, compensating for deviation at 122 includes applying the deformation function to correct for tooling deviation in the tooling fixture during production of a subsequent panel on the tooling fixture. Additionally or alternatively, compensating for deviation at 122 may include compensating for hole machining in a panel, using an established deformation function.

Figure 12:
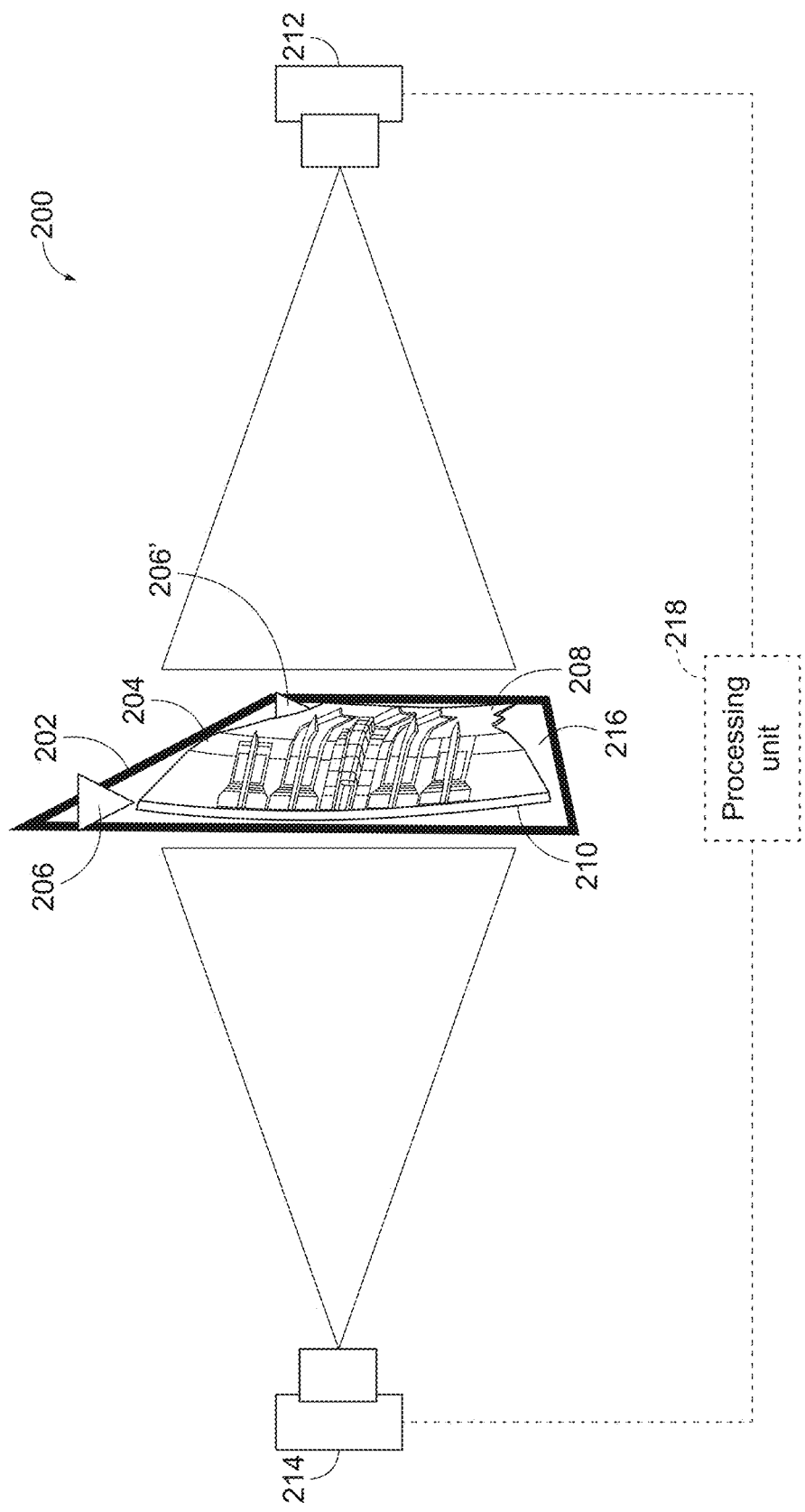
FIG. 12 is a schematic representation of non-exclusive examples of systems for mirrored scanning for tooling calibration, according to the present disclosure.
Figure 13:
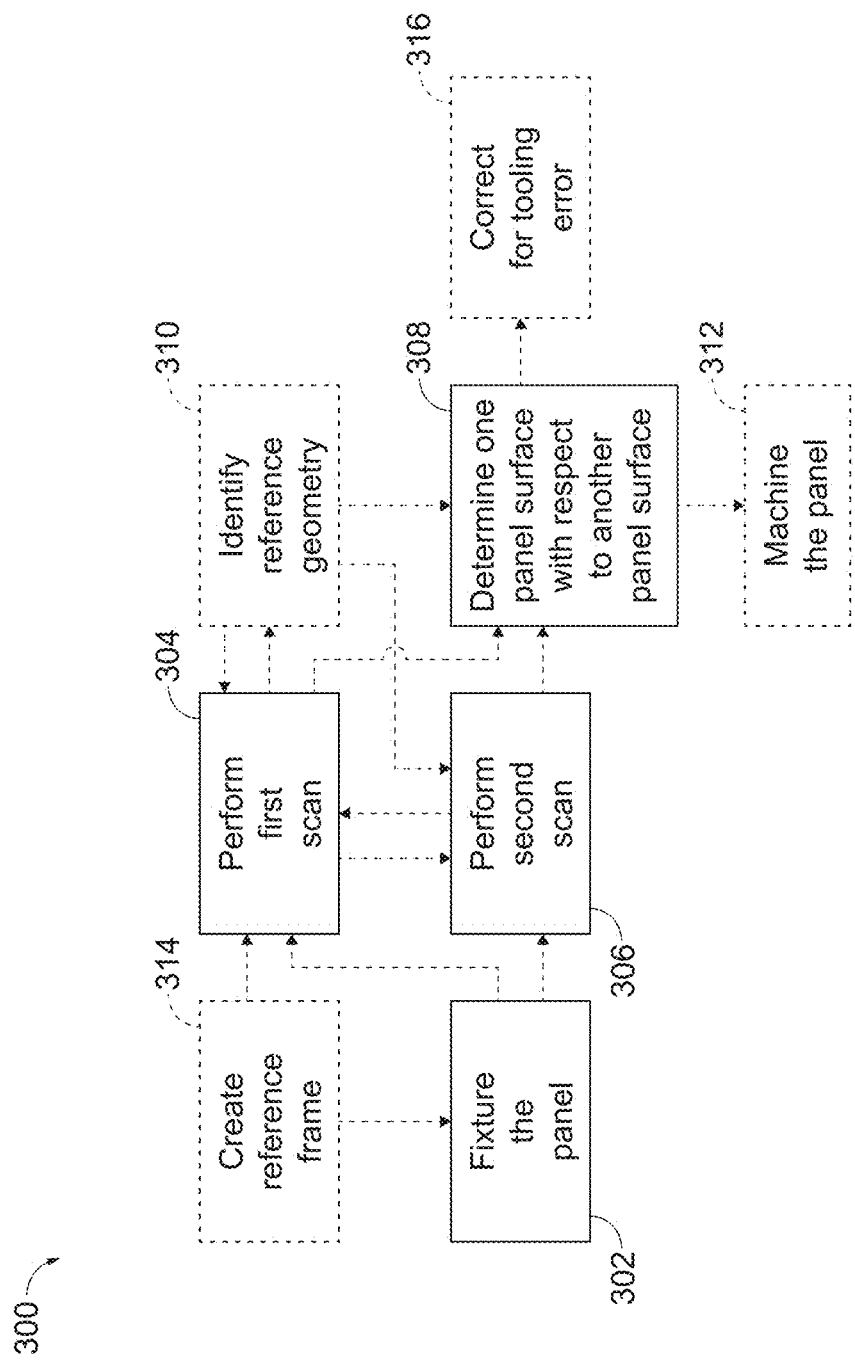
FIG. 13 is a schematic flowchart diagram of methods of mirrored scanning according to the present disclosure.

FIGS. 12 and 13 schematically illustrate systems 200 (FIG. 12) that may be used to perform methods 300 (FIG. 13) for mirrored scanning to determine deviation introduced into a panel during manufacturing. Similar to methods and systems described with respect to FIGS. 6-11, the systems and methods of FIGS. 12-13 may be used to determine a deformation function of the deviation present in a tooling fixture, compensate for such deviation, and/or determine an OML surface relative to an IML surface (or vice versa) for a given panel. While the systems and methods of FIGS. 6-11 generally involve scanning one surface of the panel at two different times, the systems and methods of FIGS. 12-13 generally involve two different surfaces of the panel using a shared reference frame.

Systems 200 generally include a fixture 202 configured to hold a panel 204 (which is an example of composite panel 70) at at least two locations, attachment points, or fixturing points 206, 206'. Fixture 202 is configured to hold panel 204 such that an inner surface 208 and an outer surface 210 (opposite inner surface 208) are both positioned to have three-dimensional surface scans performed thereon. FIG. 12 illustrates panel 204 being held substantially vertically, though in other examples, panel 204 may be held substantially horizontally, or in other configurations.

Systems 200 also include a first scanning device 212 and a second scanning device 214. First scanning device 212 is configured to perform and create a first three-dimensional surface scan on inner surface 208 with respect to a reference frame 216. Second scanning device 214 is configured to perform and create a second three-dimensional surface scan of outer surface 210, with respect to the same reference frame 216. As shown in FIG. 12, first scanning device 212 may be positioned on one side of panel 204 (e.g., facing inner surface 208), while second scanning device 214 may be positioned on the other side of panel 204 (e.g., facing outer surface 210). In other examples, such as when panel 204 is held by fixture 202 substantially horizontally, first and second scanning devices 212, 214 may be positioned such that one is located vertically below panel 204, while the other is located vertically above panel 204. Of course, any configuration is within the scope of the present disclosure, where such mirrored scanning may be effectuated, with first and second scanning devices 212, 214 positioned to scan opposite sides of panel 204.

In some examples, first scanning device 212 may scan inner surface 208 at substantially the same time second scanning device 214 scans outer surface 210. In other examples, such first and second scans may be performed at different times. In some examples, a single scanning device may be used to perform the first and second surface scans. For example, a single scanning device (e.g., scanning device 212 or 214) may be used to scan inner surface 208, and then the scanning device may be moved such that it is positioned to scan outer surface 210. Alternatively, panel 204 may be moved between the first and second scans, such that the scanning device is relatively stationary, while the panel 204 may be oriented in a first orientation during the first three-dimensional surface scan, and oriented in a second orientation during the second three-dimensional surface scan. For example, panel 204 may be positioned such that inner surface 208 faces the scanning device during the first scan, and positioned such that outer surface 210 faces the scanning device during the second scan.

Fixture 202 is illustrated as including first attachment point 206 and second attachment point 206' configured to hold panel 204, though in other examples, fixture 202 may include more or fewer attachment points 206. In some examples, respective attachment points 206 may be configured to be selectively controlled (e.g., positioned) relative to one another to position and/or hold panel 204, as desired.

Systems 200 may include a processing unit 218 configured to determine inner surface 208 relative to outer surface 210 (or vice versa) using the first three-dimensional surface scan and the second three-dimensional surface scan. In this manner, processing unit 218 is further configured to characterize a tooling deviation of a tooling fixture used to form panel 204. Fixture 202 is generally not the tooling fixture used to form panel 204 (as generally, such as tooling fixture would not permit access to both sides of the panel), though in some cases, fixture 202 may be the tooling fixture used to form the panel (or other composite structure).

First scanning device 212 and/or second scanning device 214 may be, or include, a non-contact scanning device spaced apart from the panel, such as a time-of-flight 3D laser scanner, a triangulation-based 3D laser scanner, a hand-held laser scanner, a structured-light 3D scanner, a modulated light 3D scanner, a stereoscopic video camera system, a photometric camera system, a laser-pulse-based 3D scanner, a laser phase-shift 3D scanner, and/or a lidar system. Additionally or alternatively, first scanning device 212 and/or second scanning device 214 may be, or include, a contact scanning device configured to physically contact the panel during scanning, such as a coordinate measuring machine (CMM), an articulated arm suspended from a traveling carriage, and/or a touch probe.

In use, systems 200 and/or fixtures 202 may be used, for example, in production of panels for aircraft wings and/or fuselages. Additionally or alternatively, systems 200 and/or fixtures 202 may be used in shimless or predictive shimming applications. With reference to FIG. 13, methods 300 of mirrored scanning to determine deviation introduced into a panel (e.g., panel 204) during manufacturing may be performed using systems 200. Methods 300 generally include fixturing the panel at 302, by holding it at at least two locations via a fixture (e.g., fixture 202). Once the panel is so fixtured, a first metrology scan may be performed on a first surface of the panel (e.g., outer surface 210) at 304, such as scanning with second scanning device 214, and a second metrology scan may be performed on a second surface of the panel (e.g., inner surface 208) at 306, such as scanning with first scanning device 212. Performing the first metrology scan at 304 is performed with respect to the same reference frame (e.g., reference frame 216) as is performing the second metrology scan at 306. Performing the first metrology scan at 304 produces a first 3D surface scan of the first surface of the panel, and performing the second metrology scan at 306 produces a second 3D surface scan of the second surface of the panel. Methods 300 also include determining an IML surface relative to an OML surface of the panel (e.g., determining the inner surface relative to the outer surface, and/or vice versa) at 308, during the first and second 3D surface scans. Thus, the tooling deviation of the tooling fixture used to form the panel can be characterized. Such determining the surfaces relative to one another and/or characterizing the tooling deviation at 308 may be performed by one or more processing units (e.g., processing unit 218), in some examples.

In some methods 300, performing the first metrology scan at 304 may be performed substantially simultaneously with performing the second metrology scan at 306. In other examples, first metrology scan may be performed at 304 before the second metrology scan is performed at 306, or vice versa. In some examples, the first and second metrology scans may be staggered, such that there is a period of overlap where both metrology scans are being performed, though one metrology scan may begin before the other metrology scan, and/or one metrology scan may continue once the other metrology scan is complete. Performing the first and second metrology scans at 304, 306 is generally performed while the panel is positioned on a fixture that the panel has been moved to post-cure, though in some examples, the first and/or second metrology scans may be performed at 304, 306 while the panel is positioned on a mandrel or other mold tool used to manufacture the panel. In some examples, the mandrel itself may be scanned (e.g., after the panel is removed from the mandrel) to determine the IML surface relative to the OML surface at 308. For example, a metrology scan may be performed at 306 to establish the IML surface of the panel, and then the mandrel may be scanned to establish the OML surface (in the case of an OML-controlled mandrel).

Some methods 300 include identifying a set of reference geometry using the first 3D surface scan, at 310. For example, the first 3D surface scan may be used to identify and locate one or more reference features of the panel being scanned. Additionally or alternatively, the reference frame may be created at 314 in order to align the first 3D surface scan and the second 3D surface scan. In some examples, creating the reference frame at 314 may include using known fiducials from the inner surface and the outer surface of the panel.

In some methods 300, at least a portion of the panel may be machined at 312, after determining the IML surface relative to the OML surface at 308. For example, if it is determined that the IML surface of the panel would not engage properly with an assembly due to tooling deviations being translated into the finished IML surface, appropriate portions of the IML surface may be machined down, or sacrificial material may be added, at 312, to bring the IML surface within tolerances for engagement with the rest of the assembly.

Methods 300 may include correcting for tooling deviation that is identified by comparing the first and second 3D surface scans, at 316. For examples, the first and second 3D surface scans may be analyzed in conjunction with known data analytics to correct for tooling deviation seen in production. Correcting for tooling deviation at 316 may include creating a data set representing an offset distance between the IML surface and the OML surface. Additionally or alternatively, correcting for tooling deviation at 316 may include analytically deforming the OML surface to a virtual nominal configuration.

While the present disclosure generally describes methods, systems, and header structures in the context of manufacturing panel skins for aircraft, the disclosed methods, systems, and header structures are useful in the manufacture of panel skins for other applications, and/or in the manufacture of other composite structures. For example, the present disclosure is not limited to aircraft and aircraft applications. As illustrative, non-exclusive examples, other apparatus that may be constructed of composite panel skins include (but are not limited to) spacecraft, watercraft, land vehicles, wind turbines, structural towers and masts, etc. Moreover, while aircraft 14 is illustrated in FIG. 1 as a fixed wing passenger aircraft, aircraft 14 may take any suitable form, including commercial aircraft, military aircraft, private aircraft, helicopters, or any other suitable aircraft.

Illustrative, non-exclusive examples of inventive subject matter according to the present disclosure are described in the following enumerated paragraphs:

A1. A method of tooling fixture calibration for determining deviation introduced into a panel during manufacturing, wherein the panel comprises an outer surface and an inner surface, the method comprising:

performing a first scan to create a first three-dimensional (3D) surface scan of the inner surface of the panel while the panel is secured to a tooling fixture, wherein the tooling fixture is configured to support the panel during forming of the panel such that the outer surface of the panel faces the tooling fixture;

removing the panel from the tooling fixture, wherein the removing the panel is performed after the performing the first 3D surface scan;

securing the panel to a header structure configured to hold the panel at a nominal configuration, thereby holding the panel at the nominal configuration, wherein the nominal configuration corresponds to a size and shape of the panel, as-designed;

performing a second scan to create a second 3D surface scan of the inner surface of the panel while the panel is held at the nominal configuration by the header structure; and determining a deformation function corresponding to deviation between the first 3D surface scan and the second 3D surface scan.

A1.1. The method of paragraph A1, wherein the determining the deformation function is performed by at least one processing unit.

A2. The method of paragraph A1 or A1.1, wherein the tooling fixture comprises a layup mandrel.

A3. The method of any of paragraphs A1-A2, wherein the panel comprises a composite panel.

A4. The method of any of paragraphs A1-A3, wherein the header structure comprises a plurality of foam headers.

A5. The method of any of paragraphs A1-A4, wherein the header structure is configured to hold the panel to its OML nominal configuration at rib and spar locations of the panel.

A6. The method of any of paragraphs A1-A5, wherein the holding the panel at the nominal configuration comprises drawing a vacuum, thereby forcing the panel against the header structure until the panel is in the nominal configuration.

A7. The method of any of paragraphs A1-A6, wherein the securing comprises deforming the inner surface and/or the outer surface of the panel.

A8. The method of any of paragraphs A1-A7, further comprising:

forming the header structure from the plurality of foam headers; and verifying that the header structure is configured to hold the panel in the nominal configuration.

A9. The method of paragraph A8, wherein the forming the header structure comprises positioning the foam headers to support all critical interfaces of the panel.

A10. The method of any of paragraphs A1-A9, wherein the performing the first scan comprises scanning the panel using a 3D scanning device, and wherein the performing the second scan comprises scanning the panel using the 3D scanning device.

A10.1. The method of paragraph A10, wherein the 3D scanning device comprises a non-contact scanning device spaced apart from the panel.

A10.2. The method of paragraph A10.1, wherein the 3D scanning device comprises a time-of-flight 3D laser scanner, a triangulation-based 3D laser scanner, a hand-held laser scanner, a structured-light 3D scanner, a modulated light 3D scanner, a stereoscopic video camera system, a photometric camera system, a laser-pulse-based 3D scanner, a laser phase-shift 3D scanner, and/or a lidar system.

A10.3. The method of paragraph A10, wherein the 3D scanning device comprises a contact scanning device configured to physically contact the panel during scanning.

A10.4. The method of paragraph A10.3, wherein the 3D scanning device comprises a coordinate measuring machine (CMM), an articulated arm suspended from a traveling carriage, and/or a touch probe.

A11. The method of any of paragraphs A1-A10.4, wherein the performing the first scan comprises laser scanning (e.g., 3D laser scanning), optical scanning, computed tomography scanning, structured-light scanning, conoscopic holography, photogrammetry, contact-based 3D scanning, and/or laser pulse scanning, and wherein the performing the second scan comprises laser scanning (e.g., 3D laser scanning), optical scanning, computed tomography scanning, structured-light scanning, conoscopic holography, photogrammetry, contact-based 3D scanning, and/or laser pulse scanning.

A12. The method of any of paragraphs A1-A11, wherein the determining the deformation function comprises mapping the deformation function.

A12.1. The method of paragraph A12, wherein the mapping the deformation function is performed by the at least one processing unit.

A13. The method of any of paragraphs A1-A12.1, further comprising establishing an IML surface of the panel relative to an OML surface of the panel, using the first 3D surface scan and the second 3D surface scan.

A13.1. The method of paragraph A13, wherein the establishing the IML surface of the panel relative to the OML surface of the panel is performed by the at least one processing unit.

A14. The method of any of paragraphs A1-A13.1, further comprising compensating for any deviation in the outer surface as compared to the nominal configuration of the panel, using the deformation function.

A15. The method of any of paragraphs A1-A14, further comprising compensating for any deviation in the inner surface as compared to the nominal configuration of the panel, using the deformation function.

A16. The method of any of paragraphs A1-A15, further comprising applying the deformation function to correct for tooling deviation in the tooling fixture, during production of a second panel on the tooling fixture.

A17. The method of any of paragraphs A1-A16, further comprising compensating for hole machining in the second panel, using the deformation function.

A18. The method of any of paragraphs A1-A17, further comprising performing the first 3D surface scan and the second 3D surface scan on a set of panel skins, thereby characterizing the set of panel skins to create a data set of an offset distance between an/the IML surface of each respective panel skin of the set of panel skins and an/the OML surface of each respective panel skin of the set of panel skins.

A19. The method of any of paragraphs A1-A18, further comprising using the deformation function in conjunction with known data analytics to perform predictive shimming.

A20. The method of any of paragraphs A1-A19, further comprising virtually bending the panel to its OML nominal configuration, using the deformation function.

B1. A method of mirrored scanning for determining deviation introduced into a panel during manufacturing, wherein the panel comprises an outer surface and an inner surface, the method comprising:

fixturing the panel by holding it at at least two locations via a fixture;

performing a first metrology scan on the outer surface of the panel, with respect to a reference frame, thereby producing a first 3D surface scan of the outer surface of the panel;

performing a second metrology scan on the inner surface of the panel, with respect to the reference frame, thereby producing a second 3D surface scan of the inner surface of the panel, wherein the inner surface is opposite the outer surface; and determining an IML surface relative to an OML surface, using the first 3D surface scan and the second 3D surface scan, thereby characterizing tooling deviation of a tooling fixture used to form the panel.

B1.1. The method of paragraph B1, wherein the determining the IML surface relative to the OML surface is performed by at least one processing unit.

B2. The method of paragraph B1 or B1.1, further comprising identifying a set of reference geometry using the first 3D surface scan.

B3. The method of any of paragraphs B1-B2, further comprising machining a portion of the panel, after the determining the IML surface relative to the OML surface.

B4. The method of any of paragraphs B1-B3, further comprising analytically deforming the OML surface to a virtual nominal configuration.

B5. The method of any of paragraphs B1-B4, wherein the performing the first metrology scan and the performing the second metrology scan are performed substantially simultaneously.

B6. The method of any of paragraphs B1-B5, further comprising creating the reference frame to align the first 3D surface scan and the second 3D surface scan, using known fiducials from the inner surface and the outer surface.

B7. The method of any of paragraphs B1-B6, further comprising using the first 3D surface scan and the second 3D surface scan in conjunction with known data analytics to correct for tooling deviation seen in production and create a data set representing an offset distance between the IML surface and the OML surface.

B8. The method of any of paragraphs B1-B7, wherein the performing the first metrology scan and/or the performing the second metrology scan are performed while the panel is positioned on a mandrel used in manufacturing the panel.

C1. A fixture for holding a composite part, comprising:
at least a first attachment point and a second attachment point configured to hold the composite part for post-cure machining, wherein the at least the first and the second attachment points are configured to be selectively controlled relative to one another to hold the composite part.

C1.1 The fixture of paragraph C1, wherein the fixture is configured to hold the composite part in its nominal configuration.

C2. The fixture of paragraph C1 or C1.1, wherein the fixture comprises a plurality of foam headers.

C3. The fixture of any of paragraphs C1-C2, wherein the fixture is configured to hold the composite part such that a first surface of the composite part and a second surface of the composite part may be surface scanned simultaneously, wherein the first surface is opposite the second surface.

C4. The fixture of any of paragraphs C1-C3, wherein the fixture is configured to hold the composite part to its OML nominal configuration at rib and spar locations of the composite part.

C5. The fixture of any of paragraphs C1-C4, wherein the fixture comprises a vacuum system configured to force the composite part against the first attachment point and the second attachment point such that the composite part is in its nominal configuration.

D1. A system for fixture calibration for determining deviation introduced into a composite panel during manufacturing, the system comprising:
a tooling fixture configured to support the composite panel during forming of the composite panel such that an outer surface of the composite panel faces the tooling fixture when the composite panel is supported by the tooling fixture;
a scanning device configured to perform a first 3D surface scan of an inner surface of the composite panel, while the composite panel is supported by the tooling fixture, wherein the inner surface is opposite the outer surface;
a header structure configured to hold the composite panel at a nominal configuration, wherein the nominal configuration corresponds to a size and shape of the composite panel, as-designed, wherein the header structure is configured to hold the composite panel such that the scanning device can perform a second 3D surface scan on the inner surface of the composite panel while the composite panel is held by the header structure; and
a processing unit configured to determine a deformation function corresponding to deviation between the first 3D surface scan and the second 3D surface scan.

D2. The system of paragraph D1, wherein the system is configured to perform the method of any of paragraphs A1-A20.

D3. The system of any of paragraphs D1-D2, wherein the tooling fixture comprises a layup mandrel.

D4. The system of any of paragraphs D1-D3, wherein the header structure comprises the fixture of any of paragraphs C1-C5.

D5. The system of any of paragraphs D1-D4, wherein the scanning device comprises a non-contact scanning device spaced apart from the composite panel.

D6. The system of any of paragraphs D1-D5, wherein the scanning device comprises a time-of-flight 3D laser scanner, a triangulation-based 3D laser scanner, a hand-held laser scanner, a structured-light 3D scanner, a modulated light 3D scanner, a stereoscopic video camera system, a photometric camera system, a laser-pulse-based 3D scanner, a laser phase-shift 3D scanner, and/or a lidar system.

D7. The system of any of paragraphs D1-D6, wherein the scanning device comprises a contact scanning device configured to physically contact the composite panel during scanning.

D8. The system of any of paragraphs D1-D7, wherein the scanning device comprises a coordinate measuring machine (CMM), an articulated arm suspended from a traveling carriage, and/or a touch probe.

D9. The system of any of paragraphs D1-D8, further comprising a vacuum system configured to force the composite panel against the header structure until the composite panel is in its nominal configuration.

E1. A system for mirrored scanning for determining deviation introduced into a panel during manufacturing, the system comprising:
a fixture configured to hold the panel at at least two locations such that an inner surface and an outer surface of the panel are configured to have 3D surface scans performed thereon, wherein the inner surface is opposite the outer surface;
a first scanning device configured to perform and create a first 3D surface scan on the inner surface of the panel with respect to a reference frame;
a second scanning device configured to perform and create a second 3D surface scan on the outer surface of the panel with respect to the reference frame; and
a processing unit configured to determine an IML surface relative to an OML surface using the first 3D surface scan and the second 3D surface scan, wherein the processing unit is further configured to characterize a tooling deviation of a tooling fixture used to form the panel.

E2. The system of paragraph E1, wherein the system is configured to perform the method of any of paragraphs B1-B8.

E3. The system of any of paragraphs E1-E2, wherein the first scanning device and/or the second scanning device comprise a non-contact scanning device spaced apart from the panel.

E4. The system of any of paragraphs E1-E3, wherein the first scanning device and/or the second scanning device comprise a time-of-flight 3D laser scanner, a triangulation-based 3D laser scanner, a hand-held laser scanner, a structured-light 3D scanner, a modulated light 3D scanner, a stereoscopic video camera system, a photometric camera system, a laser-pulse-based 3D scanner, a laser phase-shift 3D scanner, and/or a lidar system.

E5. The system of any of paragraphs E1-E4, wherein the first scanning device and/or the second scanning device comprise a contact scanning device configured to physically contact the panel during scanning.

E6. The system of any of paragraphs E1-E5, wherein the first scanning device and/or the second scanning device comprise a coordinate measuring machine (CMM), an articulated arm suspended from a traveling carriage, and/or a touch probe.

F1. Use of the fixture of any of paragraphs C1-C5 for production of panels for aircraft wings and/or fuselages.

F2. Use of the fixture of any of paragraphs C1-C5 in shimless or predictive shimming applications.

F3. Use of the system of any of paragraphs D1-D9 for production of panels for aircraft wings and/or fuselages.

F4. Use of the system of any of paragraphs D1-D9 in shimless or predictive shimming applications.

F5. Use of the system of any of paragraphs E1-E6 for production of panels for aircraft wings and/or fuselages.

F6. Use of the system of any of paragraphs E1-E6 in shimless or predictive shimming applications.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, a processing unit may be any suitable device or devices that are configured to perform the functions of the processing unit discussed herein. For example, the processing unit may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure.

Additionally or alternatively, the processing unit may include, or be configured to read, non-transitory computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatus and steps of methods disclosed herein are not required to all apparatus and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatus and methods that are expressly disclosed herein, and such inventive subject matter may find utility in apparatus and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A method of mirrored scanning for determining deviation introduced into a panel during manufacturing, wherein the panel comprises an outer surface and an inner surface, the method comprising:

fixturing the panel by holding it at at least two locations via a fixture;

performing a first metrology scan on the outer surface of the panel, with respect to a reference frame, thereby producing a first 3D surface scan of the outer surface of the panel;

performing a second metrology scan on the inner surface of the panel, with respect to the reference frame, thereby producing a second 3D surface scan of the inner surface of the panel, wherein the inner surface is opposite the outer surface; and determining an inner mold line (IML) surface relative to an outer mold line (OML) surface, using the first 3D surface scan and the second 3D surface scan, thereby characterizing tooling deviation of a tooling fixture used to form the panel.

2. The method according to claim 1, further comprising machining a portion of the panel, after the determining the IML surface relative to the OML surface.

3. The method according to claim 1, further comprising analytically deforming the OML surface to a virtual nominal configuration.

4. The method according to claim 1, wherein the performing the first metrology scan and the performing the second metrology scan are performed substantially simultaneously.

5. The method according to claim 1, further comprising creating the reference frame to align the first 3D surface scan and the second 3D surface scan, using known fiducials from the inner surface and the outer surface.

6. The method according to claim 1, wherein the performing the second metrology scan is performed while the panel is positioned on a mandrel used in manufacturing the panel.

7. The method according to claim 1, wherein the determining the IML surface relative to the OML surface is performed by at least one processing unit.

8. The method according to claim 1, further comprising identifying a set of reference geometry using the first 3D surface scan.

9. The method according to claim 1, further comprising using the first 3D surface scan and the second 3D surface scan in conjunction with known data analytics to correct for tooling deviation seen in production.

10. The method according to claim 1, further comprising using the first 3D surface scan and the second 3D surface scan in conjunction with known data analytics to create a data set representing an offset distance between the IML surface and the OML surface.

11. The method according to claim 1, wherein the fixturing the panel comprises holding the panel such that the inner surface and the outer surface are configured to have 3D surface scans performed thereon while the panel is held by the fixture.

12. The method according to claim 1, wherein the first metrology scan is performed by a first scanning device, and wherein the second metrology scan is a tooling deviation scan performed by a second scanning device.

13. The method according to claim 12, wherein one or both of the first scanning device and the second scanning device comprises a non-contact scanning device spaced apart from the panel.

14. The method according to claim 12, wherein one or both of the first scanning device and the second scanning device comprises a contact scanning device configured to physically contact the panel during scanning.

15. The method according to claim 12, wherein one or both of the first scanning device and the second scanning device comprises at least one selected from the group consisting of a coordinate measuring machine (CMM), an articulated arm suspended from a traveling carriage, and a touch probe.

16. The method according to claim 12, wherein the first scanning device and/or the second scanning device comprises at least one selected from the group consisting of a time-of-flight 3D laser scanner, a triangulation-based 3D laser scanner, a hand-held laser scanner, a structured-light 3D scanner, a modulated light 3D scanner, a stereoscopic video camera system, a photometric camera system, a laser-pulse-based 3D scanner, a laser phase-shift 3D scanner, and a lidar system.

17. The method according to claim 12, wherein the first scanning device is positioned facing the outer surface of the panel, and wherein the second scanning device is positioned facing the inner surface of the panel, such that the first scanning device and the second scanning device are positioned on opposite sides of the panel.

18. The method according to claim 1, further comprising determining a deformation function of the tooling deviation determined in the tooling fixture, and compensating for the tooling deviation.

19. The method according to claim 1, wherein the first metrology scan is performed by a first scanning device, wherein the second metrology scan is performed by the first scanning device, and wherein the method further comprises moving the panel with respect to the first scanning device in between the performing the first metrology scan and the performing the second metrology scan, such that the panel is oriented in a first orientation during the performing the first metrology scan and such that the panel is oriented in a second orientation during the performing the second metrology scan.

20. The method according to claim 1, wherein the first metrology scan is performed by a first scanning device, wherein the second metrology scan is performed by the first scanning device, and wherein the method further comprises moving the first scanning device with respect to the panel in between the performing the first metrology scan and the performing the second metrology scan, such that the first scanning device is positioned to scan the outer surface of the panel during the performing the first metrology scan and such that the first scanning device is positioned to scan the inner surface of the panel during the performing the second metrology scan.

* * * * *